(12) United States Patent
Katsuno et al.

(10) Patent No.: US 7,637,245 B2
(45) Date of Patent: Dec. 29, 2009

(54) METHOD AND SYSTEM FOR CONTROLLING AN ACTUATOR TO ROTATE A VALVE

(75) Inventors: Masato Katsuno, Anjo (JP); Hiroshi Haraguchi, Kariya (JP); Eiji Takemoto, Oobu (JP); Tatsuya Fujita, Oobu (JP)

(73) Assignee: DENSO Corporation, Kariya (JP)

( * ) Notice: Subject to any disclaimer, the term of this patent is extended or adjusted under 35 U.S.C. 154(b) by 335 days.

(21) Appl. No.: 11/583,787

(22) Filed: Oct. 20, 2006

(65) Prior Publication Data

US 2007/0089708 A1 Apr. 26, 2007

(30) Foreign Application Priority Data

Oct. 20, 2005 (JP) ............................. 2005-306287

(51) Int. Cl.
- *F02D 11/10* (2006.01)
- *G06F 19/00* (2006.01)
- *F02M 25/07* (2006.01)

(52) U.S. Cl. .................. 123/396; 123/399; 123/568.26; 701/110; 701/115; 251/129.04

(58) Field of Classification Search ................. 123/396, 123/397, 399, 568.11, 568.23, 568.26, 129.04; 701/110, 115; 251/129.04
See application file for complete search history.

(56) References Cited

U.S. PATENT DOCUMENTS 6,276,333 B1 * 8/2001 Kazama et al. ............. 123/399

| 6,766,785 | B2 * | 7/2004 | Ishida et al. ................. 123/399 |
| 7,040,283 | B2 * | 5/2006 | Soshino et al. .............. 123/337 |
| 7,243,635 | B2 * | 7/2007 | Soshino et al. .............. 123/337 |
| 7,266,891 | B2 * | 9/2007 | Hannewald ............... 29/890.12 |
| 2005/0183696 | A1 * | 8/2005 | Soshino et al. .............. 123/399 |
| 2007/0052383 | A1 * | 3/2007 | Abe et al. .................... 318/651 |
| 2007/0057646 | A1 * | 3/2007 | Hsu et al. .................... 318/466 |

FOREIGN PATENT DOCUMENTS

| JP | 2001-173464 | 6/2001 |
| JP | 2003-314377 | 11/2003 |

* cited by examiner

*Primary Examiner*—Stephen K Cronin
*Assistant Examiner*—Arnold Castro
(74) *Attorney, Agent, or Firm*—Nixon & Vanderhye P.C.

(57) ABSTRACT

In a system, an actuator is linked to a valve rotatably installed in a passage through which gas flows. The actuator changes torque to be applied to the valve so as to adjust a rotational position of the valve based on a deviation between a current position and a target position. In the system, a first storing unit stores therein a first threshold. The first threshold is defined in a variation range within which a torque parameter is variable depending on change in the torque to be applied to the valve. The first threshold allows whether there is a possibility that an operation of the actuator is unstable. If the torque parameter substantially shifts either to or through the first threshold in the variation range, a restricting unit restricts variation in the torque parameter with the gas-flow being substantially kept through the passage.

15 Claims, 6 Drawing Sheets

METHOD AND SYSTEM FOR CONTROLLING AN ACTUATOR TO ROTATE A VALVE

CROSS REFERENCE TO RELATED APPLICATION

This application is based on Japanese Patent Application 2005-306287 filed on Oct. 20, 2005. This application aims at the benefit of priority from the Japanese Patent Application, so that the descriptions of which are all incorporated herein by reference.

BACKGROUND OF THE INVENTION

1. Field of the Invention

The present invention relates to methods and systems for controlling an actuator to rotate a valve installed in a passage through which gas flows, thereby adjusting an opening area of the passage.

More particularly, the present invention relates to methods and systems are capable of controlling an actuator to control rotation of a valve installed in an exhaust-gas recirculation passage through which part of exhaust gas emitted from an exhaust manifold coupled to each cylinder of an engine is returned into a combustion chamber of the engine. The valve rotation control via the actuator allows an opening area of the exhaust-gas recirculation passage to be adjusted, making it possible to reduce emissions in the exhaust gas.

2. Description of the Related Art

Conventional EGR (Exhaust Gas Recirculation) control systems include a substantially discoid valving element disposed in an exhaust-gas recirculation passage to be rotatable. The rotation of the valving element allows adjustment of an opening area of the exhaust-gas recirculation passage.

The conventional EGR control systems also include an actuator configured to give force to the valving element to rotate it, and include a spring configured to constantly bias the valving element toward the passage closing direction.

The conventional EGR control systems include a seal ring mounted on the outer periphery of the valving element such that the seal ring prevents exhaust gas from leaking toward the inlet side of the engine when the valving element is located close to a fully close position where the passage is fully closed. Moreover, the conventional EGR control systems include a controller operative to provide instructions to the actuator to control the opening and closing of the valving element.

As the actuator, an electric motor is commonly used. When the controller energizes the electric motor via a motor driver, the energized electric motor generates torque so that the generated torque is imparted to the valve shaft to rotate it together with the valving element.

The electric motor can switch the direction of the torque imparted thereby between the passage opening direction and the passage closing direction.

The controller is operative to determine, according to the engine operating conditions, a command position of the valving element that allows the opening of the exhaust-gas recirculation passage to be properly determined depending on the engine operating conditions.

Next, the controller is operative to obtain the deviation between the command position and a current position of the valving element sensed by a position sensor, and to calculate a command value corresponding to the required amount and/or direction of power to be supplied to the electric motor based on the obtained deviation. It is to be noted that the command position of the valving element will be referred to as "target valve position", and the sensed current position of the valving element will be referred to as "current valve position".

After the calculation of the command value, control signals are determined by the controller based on the command value corresponding to a required amount and/or direction of power, and the determined control signals are output to the motor driver. The motor driver controls the amount and/or direction of power to be supplied to the electric motor. This allows the current valve position to substantially agree with the target valve position, making it possible to perform the exhaust-gas recirculation depending on the engine operating conditions.

When the force applied to the valving element by the electric motor causes the valving element to rotate toward the target valve position, the valving element is subjected to resistance against the application force. The resistance is the resultant of: biasing force (spring force) of the spring toward the passage closing direction, sliding frictional force of the seal ring against the inner wall of the exhaust-gas recirculation passage, sliding frictional force between the outer periphery of a valve shaft and bearings rotatably supporting the valve shaft, and the like.

The sliding frictional force as the component of the resistance changes with a change in amount of deposits, such as black smoke particles and oil mist particles, these deposits are accumulated between, for example, the inner passage wall and the valving element.

Increase of the sliding friction force due to the accumulation of the deposits requires increase of the application force to the valving element. This may increase the amount of power to be supplied to the electric motor, resulting that stable operation of the electric motor may be difficult.

For this reason, in such conventional EGR control systems, a predetermined upper limit on the amount of power to be fed to the electric motor is determined to maintain stable operation of the electric motor, and is stored in, for example, the controller beforehand. Specifically, if the amount of power supplied to the electric motor reaches the upper limit, the controller halts the supply of power to the electric motor.

In the power supply control, however, the valving element has been subjected to no force for rotating the valving element toward the passage opening direction since the stop of power supply to the electric motor. For this reason, the spring force causes the valving element to be continuously biased in the passage closing direction so that the current valve position coincides with the fully close position. This results in that the exhaust gas is fully transferred to the outlet side of the engine, which may cause emissions in the exhaust gas to significantly increase.

In order to solve the problem due to the stop of power supply to the electric motor, techniques for eliminating the deposits to reduce the sliding friction force have been proposed, which are disclosed in, for example, Japanese Unexamined Patent Publications No. 2001-173464 and No. 2003-314377. These techniques can prevent the power supply to the electric motor from being halted.

The deposit removal operation is executed after it is determined to require the deposit removal operation in any way. This causes a time lag between when it is determined that the deposit removal operation is needed, in other words, when the amount of power supplied to the electric motor approaches the upper limit, and when the deposit removal operation is actually executed.

For this reason, when a large volume of deposits tends to rapidly occur under specific operating conditions of the vehicle, such as under hard acceleration, the amount of power supplied to the electric motor may reach the upper limit during the time-lag. This may cause the supply of power to the electric motor to be halted.

SUMMARY OF THE INVENTION

In view of the background, an object of at least one aspect of the present invention is to provide methods and systems for controlling an actuator to rotate a valve rotatably installed in a passage through which gas flows, these methods and systems are capable of ensuring the stable operation of the actuator even though power to be supplied to the actuator reaches a threshold limiting an operational stability of the actuator.

According to one aspect of the present invention, there is provided a system for controlling an actuator that is linked to a valve rotatably installed in a passage through which gas flows and that is configured to change, based on a deviation between a current position of the valve and a target position thereof, torque to be applied to the valve. The system includes a first storing unit configured to store therein a first threshold. The first threshold is defined in a variation range within which a torque parameter is variable depending on change in the torque to be applied to the valve. The first threshold allows determination of whether there is a possibility that an operation of the actuator is unstable. The system also includes a restricting unit configured to, if the torque parameter substantially shifts to and/or through the first threshold in the variation range, restrict variation in the torque parameter with a flow of the gas being substantially kept through the passage.

According to another aspect of the present invention, there is provided a program product embedded in a memory for controlling an actuator that is linked to a valve rotatably installed in a passage through which gas flows and that is configured to change, a deviation between a current position of the valve and a target position thereof, torque to be applied to the valve. The program product includes first means for instructing a computer to store in a memory a first threshold. The first threshold is defined in a variation range within which a torque parameter is variable depending on change in the torque to be applied to the valve. The first threshold allows determination of whether there is a possibility that an operation of the actuator is unstable. The program product includes first means for instructing a computer to retrieve a first threshold from at least one of the first memory and a second memory. The first threshold is stored in at least one of the first and second memories in advance. The first threshold is defined in a variation range within which a torque parameter is variable depending on change in the torque to be applied to the valve. The first threshold allows determination of whether there is a possibility that an operation of the actuator is unstable, The program also includes second means for instructing a computer to, if the torque parameter substantially shifts to and/or through the first threshold in the variation range, restrict variation in the torque parameter with a flow of the gas being substantially kept through the passage.

According to a further aspect of the present invention, there is provided a method of controlling an actuator that is linked to a valve rotatably installed in a passage through which gas flows and that is configured to change, based on a deviation between a current position of the valve and a target position thereof, torque to be applied to the valve. The method includes storing therein a first threshold. The first threshold is defined in a variation range within which a torque parameter is variable depending on change in the torque to be applied to the valve. The first threshold allows determination of whether there is a possibility that an operation of the actuator is unstable. The method also includes, if the torque parameter substantially shifts to and/or through the first threshold in the variation range, restricting variation in the torque parameter with a flow of the gas being substantially kept through the passage.

BRIEF DESCRIPTION OF THE DRAWINGS

Other objects and aspects of the invention will become apparent from the following description of embodiments with reference to the accompanying drawings in which:

FIG. 2 is a graph schematically illustrating:

a relationship between an angular position of a butterfly valve and the volume of gas flow passing through the butterfly valve; and a relationship between a command duty cycle and the angular position of a butterfly valve according to the first embodiment;

DETAILED DESCRIPTION OF EMBODIMENTS OF THE INVENTION

Embodiments of the present invention will be described hereinafter with reference to the accompanying drawings.

First Embodiment

Figure 1:
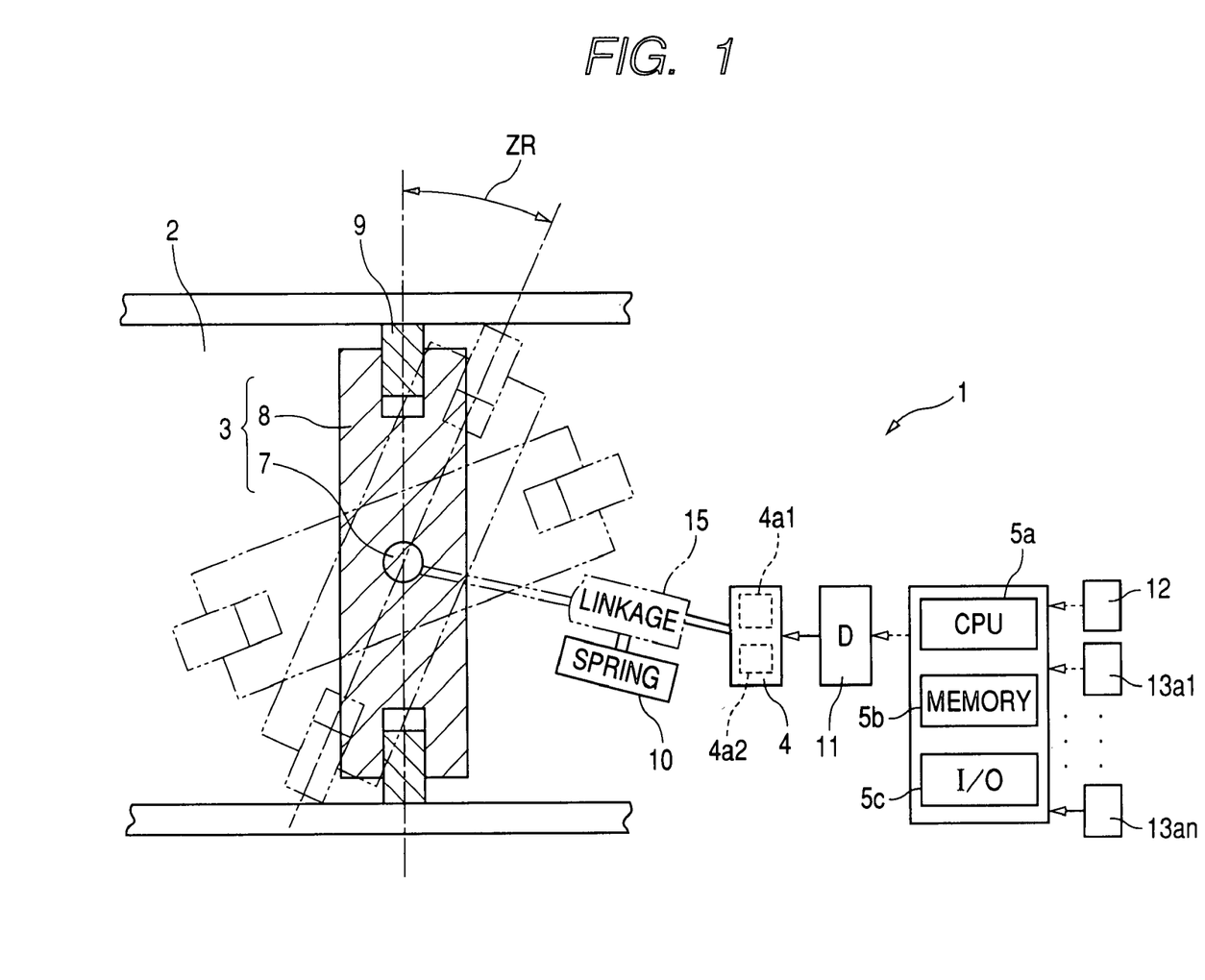
FIG. 1 is a view schematically illustrating an example of the structure of an exhaust gas recirculation system according to a first embodiment of the present invention.

An example of the structure of an EGR (Exhaust Gas Recirculation) control system 1 according to a first embodiment of the present invention is illustrated in FIG. 1 as an example of systems for adjusting an opening area of a gas flow passage.

Specifically, as illustrated in FIG. 1, the EGR control system 1 installed in a vehicle is composed of a butterfly valve 3, an actuator (M) 4, a spring 10, an actuator driver (D) 11, and an electronic control unit (ECU) 5.

The butterfly valve 3 is disposed in an exhaust-gas recirculation passage, referred to as "EGR passage", 2 through which part of exhaust gas emitted from an exhaust manifold coupled to exhaust ports of each cylinder of an engine installed in the vehicle is returned into a combustion chamber of the engine.

The butterfly valve 3 is composed of a valve shaft 7 arranged in the center of a predetermined portion of the EGR passage 2 in orthogonal to the length direction of the EGR passage 2 and rotatably supported by, for example, bearings (not shown). The butterfly valve 3 is also composed of a substantially discoid valving element 8 joined symmetrically to the valve shaft 7.

The actuator 4 is mechanically linked to the linkage 15, and the linkage 15 is mechanically linked to the valve shaft 7. The actuator 4 is operative to apply torque to the valve shaft 7 via the linkage 15 to rotate it.

The ECU 5 is operative to provide instructions to the actuator 4 through the actuator driver 11 to control, via the actuator 4, the rotation of the valve shaft 7 together with the valving element 8.

The spring 10 is configured to, for example, mechanically link to the linkage and to constantly bias the valving element 8 toward the passage closing direction.

In the first embodiment, as the actuator 4 and actuator driver 11, an electric motor and a motor driver are used.

When the controller energizes the electric motor 4 via the motor driver 11, the energized electric motor 4 generates torque so that the generated torque is applied to the valve shaft 7 to rotate it together with the valving element 8 in the passage opening direction or the passage closing direction. This allows the opening of the EGR passage 2 to be adjusted.

The EGR control system 1 is also composed of a seal ring 9 mounted on the outer periphery of the valving element 8 such that the seal ring 9 prevents exhaust gas from leaking toward the inlet side of the engine when the valving element 8 is located close to a fully close position where the passage is fully closed.

It is to be noted that, when the torque applied to the valve 3 by the electric motor 4 causes the valve 3 to rotate in the passage opening direction, the valve 3 is subjected to resistance against the application torque.

The resistance is the resultant of: biasing force (spring force) of the spring toward the passage closing direction, sliding frictional force of the seal ring 9 against the inner wall of the EGR passage 2, sliding frictional force between the outer periphery of the valve shaft 7 and bearings (not shown) rotatably supporting the valve shaft 7, and the like.

The sliding frictional force as the component of the resistance changes with a change in amount of deposits, such as black smoke particles and oil mist particles, these deposits are accumulated between, for example, the inner wall of the EGR passage 2 and the valving element 8.

The electric motor 4 is operative to switch the direction of the application torque to the valving element 8 between the passage opening direction and the passage closing direction in response to instructions sent from the ECU 5.

The electric motor 4 is preferably composed of first and second coils 4$a$1 and 4$a$2. In response to an instruction sent from the ECU 5, the first coil 4$a$1 is configured to receive power being supplied from the motor driver 11 and to create application torque that allows the butterfly valve 3 (valve shaft 7 and the valve member 8) to rotate in the passage opening direction.

On the other hand, in response to another instruction sent from the ECU 5, the second coil 4$a$2 is configured to receive power being supplied from the motor driver 11 and to create application torque that allows the butterfly valve 3 to rotate in the passage closing direction.

Note that the electric motor can be composed of a single coil. In this structure, in response to switch between the first instruction and second instruction sent from the ECU 5, the electric motor can be configured to reverse the polarity of power to be supplied to the single coil. This allows the direction of application torque created by the single coil to be switched between the passage opening direction and the passage closing direction. This allows the butterfly valve 3 to switchably rotate in the opening direction and closing direction.

The ECU 5 has a normal computing unit. Specifically, the ECU 5 consists essentially of a CPU (Central Processing Unit) 5$a$, a memory unit 5$b$ including a ROM (Read Only Memory), a RAM (Random Access Memory), and the like, an input and output unit 5$c$ including an analog to digital converting function (A/D converting function), and other peripherals. The ECU 5 can carry out various tasks based on cooperation between the CPU 5$a$, the memory unit 5$b$, and the input and output unit 5$c$ in accordance with programs installed in advance in the memory unit 5$b$.

The ECU 5 is operative to periodically monitor measurands output from sensors including a valve angular position sensor 12 as an example of rotational position sensors, a crank angle sensor 13$a$1, an accelerator position sensor 13$a$2, coolant temperature sensor 13$a$3, an intake air flow sensor 13$a$4, an intake air temperature sensor 13$a$5, an intake air pressure sensor 13$a$6, an oxygen sensor 13$a$7, and the like. The ECU 5 is operative to grasp the operating conditions of the engine and/or the driving conditions of the vehicle based on the monitored measurands.

For example, the valve angular position sensor 12 is configured to periodically measure a current angular position as an example of a rotational position with respect to a fully close position, and to periodically output the measured current angular position to the ECU 5. The fully close position is used as an example of a predetermined reference angular position of the valving element 8. It is to be noted that the fully close position means a position of the valving element 8 at which the EGR passage 2 is fully closed.

The ECU 5 is also operative to periodically compute, as a target angular position with respect to the fully close position, a command angular position of the valving element 8 based on a corresponding a set of the periodically monitored measurands. The computed command angular position of the valving element 8 is properly determined depending on the grasped operating conditions of the engine and/or the driving conditions of the vehicle.

The ECU 5 is also operative to periodically obtain the deviation between the target angular position and the current angular position, and to periodically compute a command value corresponding to a required amount and/or direction of power to be supplied to the electric motor 4 based on the obtained deviation. The required amount and/or direction of power allow the electric motor 4 to rotate so that the valving element 8 is located at the target angular position.

For example, the sign of deviation is determined such that:

when the target angular position of the valving element 8 with respect to the fully close position is greater than the current angular position thereof with respect to the fully close position, the deviation between the target angular position and the current angular position is positive; and when the target angular position of the valving element 8 with respect to the fully close position is smaller than the current angular position thereof with respect to the fully close position, the deviation between the target angular position and the current angular position is negative.

It is to be noted that the deviation is expressed as an absolute value representing the amount of deviation between the target angular position and the current angular position.

The ECU 5 is further operative to periodically compute, as an instruction to be given to the motor driver 11, a command duty cycle (command duty factor) that determines an amount of power to be supplied to the electric motor 4 via the motor driver 11, and to periodically output the computed command duty cycle to the motor driver 11.

For example, the command duty cycle is defined as the ratio of on time to the sum of on time and off time in a given cycle. Preferably, the command duty cycle is expressed as a percentage (%).

For example, the motor driver 11 is operative to periodically generate a pulsed current consisting of a sequence of current pulses, the duration of each current pulse being determined based on the command duty cycle output from the ECU 5, thereby periodically controlling the amount of power to be supplied to the electric motor 4.

The ECU 5 of the EGR control system 1 according to the first embodiment has various characteristics associated with control of the angular position of the valving element 8, which will be described hereinafter.

Specifically, the ECU 5 uses an application torque parameter for control of the angular position of the valving element 8; this application torque parameter represents the variance of the application torque to the butterfly valve 3, so that it determines the behavior of the application torque to the butterfly valve 3.

Because the power to be supplied to the electric motor 4 from the motor actuator 11 determines the amount and direction of application torque, the application torque parameter is also correlated with the power to be supplied to the electric motor 4.

In addition, the command duty cycle to be sent to the motor actuator 11 from the ECU 5 determines the amount of power to be supplied to the first coil 4a or second coil 4b of the electric motor 4 from the motor actuator 11. For this reason, the application torque parameter is also correlated with the command duty cycle.

In the first embodiment, as the application torque parameter, the ECU 5 adopts the command duty cycle.

The ECU 5 is operative to separate a numerical range within which the application torque parameter can take values into an allowable range AR and an unallowable range UR, and to define a first threshold duty cycle T1 as the border between the allowable range AR and the unallowable range UR. The ECU 5 is operative to store the first threshold duty cycle T1 in the memory unit 5b. The allowable range AR and the unallowable range UR are established on the basis of the operational stability of the electric motor 4.

It is to be noted that the "operational stability of the electric motor 4" means a predetermined operating condition of the electric motor 4 in which variations in the performance of the electric motor 4 due to heat liberated by the supply of power to the electric motor 4 fall within a predetermined predicted range. For example, the performance of the electric motor 4 includes the number of revolutions of the electric motor 4, the amount of torque created thereby, and the like.

The first threshold duty cycle T1 defining the limit to the operational stability of the electric motor 4 is determined depending on the predetermined predicted range.

Specifically, the first threshold duty cycle T1 allows the numerical range within which the application torque parameter can take values to be separated between the allowable range AR and the unallowable range UR. For this reason, when the command duty cycle (the application torque parameter) takes values within the allowable range AR, it can be estimated that variations in the operating performance of the electric motor 4 will fall within the predicted range. Accordingly, it is possible to ensure the operational stability of the electric motor 4.

In contrast, when the command duty cycle (the application torque parameter) takes values within the unallowable range UR, it is difficult to estimate that variations in the operating performance of the electric motor 4 will fall within the predicted range. Accordingly, it is difficult to ensure the operational stability of the electric motor 4.

Figure 2:
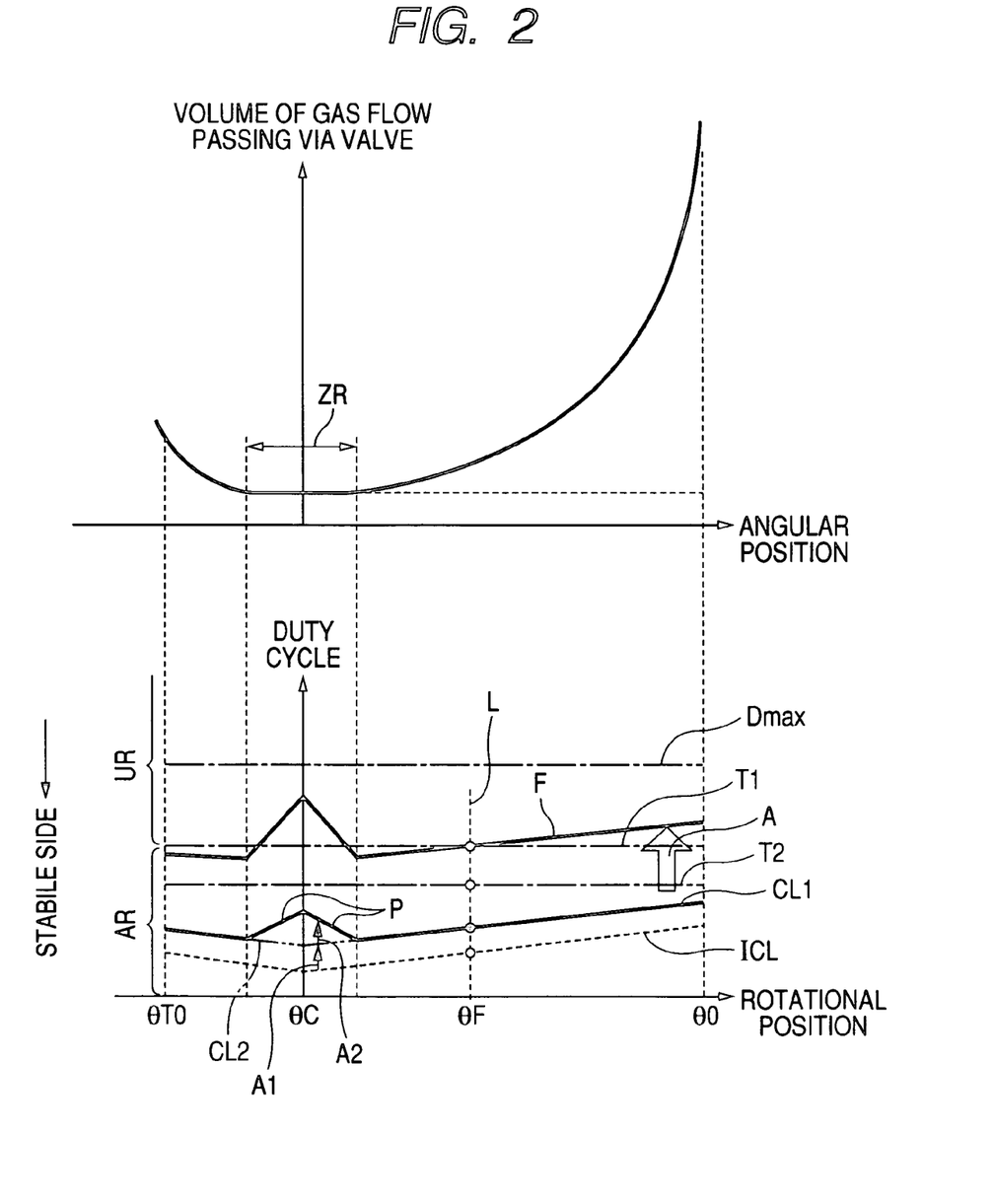

As illustrated in FIG. 2, the first threshold duty cycle T1 is set within the range between a maximum duty-cycle line Dmax and an ideal duty-cycle control line ICL. It is to be noted that "duty-cycle control line" represents continuous values of the command duty cycle with respect to continuously changed angular positions of the valving element 8. The continuous values of the command duty cycle are respectively required to rotate, in the passage opening direction, the valving element 8 located at the continuously changed angular positions of the valving element 8.

Specifically, while the valving element 8 is rotating, deposits, such as black smoke particles and oil mist particles, contained in the recirculated exhaust gas are accumulated between, for example, the inner wall of the EGR passage 2 and the valving element 8. The control lines therefore depend on the accumulated amount of the deposits between the inner wall of the EGR passage 2 and the valving element 8.

In addition, the ideal duty-cycle control line ICL represents continuous values of the command duty cycle with respect to continuously changed angular positions of the valving element 8 assuming that no deposits are accumulated between the inner wall of the EGR passage 2 and the valving element 8. As illustrated in FIG. 2, the ideal duty-cycle control line ICL has a predetermined shape. It will be described how the predetermined shape of the ideal duty-cycle control line ICL is defined hereinafter.

It is to be noted that the command duty cycle mainly contributes to:

first countervailing torque to be created by the electric motor 4 against the biasing force (spring force) of the spring toward the passage closing direction;

second countervailing torque to be created by the electric motor 4 against the sliding frictional force of the seal ring 9 against the inner wall of the EGR passage 2; and third countervailing torque to be created by the electric motor 4 against the sliding frictional force between the outer periphery of the valve shaft 7 and the bearings.

The farer the angular position of the valving element 8 is away from the fully close position (see "θC" in FIGS. 1 and 2), the stronger the spring force is. For this reason, a first component of the command duty cycle contributing to the first countervailing torque against the spring force gradually increases with change in the angular position of the valving element 8 from the fully close position θC toward the fully open position (see "θO" in FIG. 2) or toward an overturn-side full open position (see "θTO" in FIG. 2).

It is to be noted that the overturn-side full open position θTO means an angular position of the valving element 8 where the EGR passage 2 is fully opened because of the overturn of the valving element 8 through the fully close position θC.

A duty-cycle control line CL1 of the first component of the command duty cycle contributing to the first countervailing torque with respect to continuously changed angular positions of the valving element 8 therefore gradually increases with change in the angular position of the valving element 8 from the fully close position θC toward both the fully open position θO and the overturn-side full open position θTO.

In addition, the spring force substantially frees of the influence of the deposits.

For this reason, the duty-cycle control line CL1 of the first component of the command duty cycle is unique independently of the amount of deposits accumulated between the inner wall of the EGR passage 2 and the valving element 8.

The sliding frictional force of the seal ring 9 against the inner wall of the EGR passage 2 acts in only a predetermined range of the angular position of the valving element 8 within which the seal ring 9 is kept abutting on the inner wall of the EGR passage 2.

In other words, within the predetermined range of the angular position of the valving element 8, the EGR passage 2 is substantially kept fully closed so that the volume of flow of recirculated gas that can pass through the butterfly valve 3 becomes substantially zero. The predetermined range of the angular position of the valving element 8 will be referred to as "gas-flow zero range" hereinafter (see "ZR" in FIGS. 1 and 2).

The more the angular position of the valving element 8 approaches to the fully close position θC, the stronger suppress-strength acting between the inner wall of the EGR passage 2 and the seal ring 9 is. For this reason, the more the angular position of the valving element 8 approaches to the fully close position θC, the stronger the sliding frictional force of the seal ring 9 against the inner wall of the EGR passage 2 is.

This results in that a second component of the command duty cycle contributing to the second countervailing torque against the sliding frictional force of the seal ring 9 is necessary only when the angular position of the valving element 8 remains within the gas-flow zero range ZR. The second component of the command duty cycle increases with approach of the angular position of the valving element 8 to the fully close position θC.

The sliding frictional force between the outer periphery of the valve shaft 7 and the bearings is substantially kept constant independently of any angular positions of the valving element 8.

Accordingly, the third component of the command duty cycle corresponding to the sliding frictional force between the outer periphery of the valve shaft 7 and the bearings allows the duty-cycle control line CL1 to be upwardly biased. In FIG. 2, the biasing is illustrated by an arrow A1, and the biased control line is illustrated by two-dot chain line as duty-cycle control line CL2.

In addition, as set forth above, the second component of the command duty cycle increases with approach of the angular position of the valving element 8 to the fully close position θC within the gas-flow zero range ZR. For this reason, the second component of the command duty cycle causes part P of the duty-cycle control line CL2 with respect to the angular positions of the valving element 8 remaining within the gas-flow zero range ZR to rise with approach of the angular position of the valving element 8 to the fully close position θC (see an arrow AR2 of FIG. 2).

This allows, as illustrated in FIG. 2, the ideal duty-cycle control line ICL to be obtained; this ideal duty-cycle control line ICL has:

a maximum duty cycle when the angular position of the valving element 8 is the fully close position θC;

a symmetrical triangular shape with respect to the maximum duty cycle as its apex of the triangular shape within the gas-flow zero range ZR; and gradually upward slopes within the remaining ranges both sides of the gas-flow zero range ZR toward the fully open position θO and the overturn-side full open position θTO from the gas-flow zero range ZR.

As set forth above, the ideal duty-cycle control line ICL represents continuous values of the command duty cycle with respect to continuously changed angular positions of the valving element 8 assuming that no deposits are accumulated between the inner wall of the EGR passage 2 and the valving element 8.

In addition, the sliding frictional force increases with increase of the volume of the deposits accumulated between the inner wall of the EGR passage 2 and the valving element 8.

For these reasons, duty-cycle control lines corresponding to continuous values of the command duty cycle to be actually sent to the motor driver 11 from the ECU 5 with respect to continuously changed angular positions of the valving element 8 are representable by upwardly biasing the ideal duty-cycle control line ICL depending on the volume of the deposits accumulated between the inner wall of the EGR passage 2 and the valving element 8 (see an arrow A in FIG. 2).

Specifically, the ECU 5 is operative to execute the feedback control of the command duty cycle to be output therefrom to the motor driver 11 in accordance with at least one of the duty-cycle control lines so that the current angular position of the valving element 8 substantially agrees with the target angular position thereof.

In addition, when the feed back control causes the deviation between the target angular position and the current angular position to fall below a predetermined threshold (a predetermined positive angle) D, and the command duty cycle shifts to the first threshold duty cycle from the allowable range AR, or falls within the unallowable range UR, the ECU 5 is operative to:

control the command duty cycle so that it falls within the allowable range AR with the exhaust gas being kept substantially recirculated in the EGR passage 2 toward the inlet side of the engine.

Specifically, when the command duty cycle shifts to the first threshold duty cycle from the allowable range AR, in other words, to the upper limit of the allowable range AR, or falls within the unallowable range UR, the ECU 5 reduces the command duty cycle to prevent the current angular position of the valving element 8 from falling within the gas-flow zero range ZR.

In other words, the ECU 5 reduces the command duty cycle to keep the power supply to the electric motor 4, thereby preventing the angular position of the valving element 8 from shifting into the gas-flow zero range ZR due to the spring force.

For example, the ECU 5 is operative to store, in advance, a second threshold duty cycle T2 in the memory unit 5b. The second threshold duty cycle T2 lies within the allowable range AR below the first threshold duty cycle T1, in other words, the second threshold duty cycle T2 is shifted from the first threshold duty cycle T1 toward the operation stable side of the electric motor 4. In addition, the second threshold duty cycle T2 is set to be higher than any values of the command duty cycle on the duty-cycle control line CL1 with respect to all of the angular positions of the valving element 8.

For example, it is assumed that an angular position at which a duty-cycle control line F and the first threshold duty cycle T1 intersect with each other is expressed as θF. In this assumption, let us consider that the ECU 5 is operative to execute the feedback control of the command duty cycle to be output therefrom to the motor driver 11 in accordance with the duty-cycle control line F (see FIG. 2).

In this case, when the command duty cycle is shifted to the first threshold duty cycle T1 in accordance with the duty-cycle control line F so that the valving element 8 is located at the angular position θF, the ECU 5 is operative to reduce the command duty cycle corresponding to the first threshold duty cycle T1 up to the second duty cycle T2 along a line representing the rotational position continuously equal to the angular position θF (see the dashed line to which reference character L is assigned in FIG. 2).

It is to be noted that the sliding frictional force as the component of the resistance actively contributes against rotation of the butterfly valve 3, but it is inactive against hold of the butterfly valve 3 at a given angular position. For this reason, upon hold of the butterfly valve 3 at a predetermined angular position, the application torque that allows the butterfly valve 8 to rotate mainly against the spring force is required.

Accordingly, the ECU 5 makes it possible to reduce the command duty cycle so that it lies on the duty-cycle control line CL1 contributing to the first countervailing torque against the spring force while keeping the angular position of the valving element 8 at the angular position θF at which the command duty cycle is shifted to the first threshold duty cycle T1.

As set forth above, the ECU 5 permits the command duty cycle to decrease up to the second threshold duty cycle T2 while stably maintaining the exhaust gas substantially recirculated in the EGR passage 2 toward the inlet side of the engine. In other words, the ECU 5 can reduce the command duty cycle up to the second threshold duty cycle T2 while preventing the current angular position of the valving element 8 from reaching the gas-flow zero range ZR.

Figure 3:
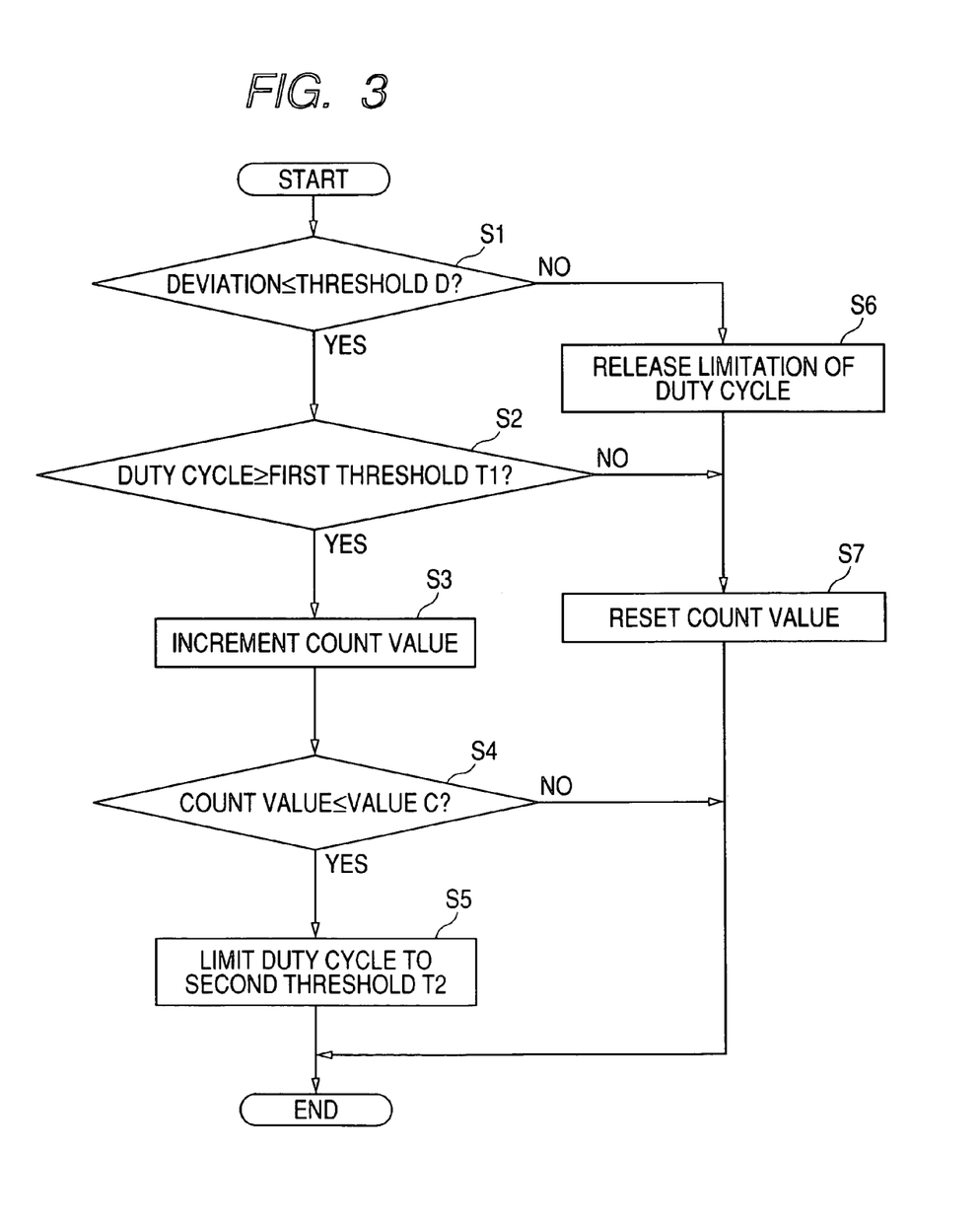
FIG. 3 is a flowchart schematically illustrating an exhaust-gas recirculation task to be executed by an ECU according to the first embodiment.

FIG. 3 schematically illustrates an exhaust-gas recirculation task (an adjusting task of the opening area of the EGR passage 2), the summary of which has been described hereinbefore, to be executed by the ECU 5 in accordance with at least one program to be loaded to the memory unit 5b. Specifically, the ECU 5 periodically executes the exhaust-gas recirculation task in response to, for example, input of a measured current angular position of the valving element 8 sent from the valve angular position sensor 12.

In step S1, the ECU 5 computes a target angular position of the valving element 8 based on monitored measurands sent from the sensors 13a1 to 13an, and determines whether the deviation between the target angular position and the current angular position is equal to or lower than the predetermined positive threshold D.

The operation in step S1 allows determination of whether the current angular position of the valving element 8 substantially agrees with the target angular position.

If it is determined that the deviation between the target angular position and the current angular position is equal to or lower than the predetermined positive threshold D (the determination in step S1 is YES), the ECU 5 proceeds to step S2, and otherwise proceeding to step S6.

In step S2, the ECU 5 retrieves the first threshold duty cycle T1 from the memory unit 5b, and determines whether a current value of the command duty cycle is equal to or higher than the first threshold duty cycle T1. The operation in step S2 allows determination of whether the current value of the command duty cycle shifts to the first threshold duty cycle T1 or falls within the unallowable range UR.

If it is determined that the current value of the command duty cycle is equal to or greater than the first threshold duty cycle T1 (the determination in step S2 is YES), the ECU 5 proceeds to step S3, and otherwise proceeding to step S7.

In step S3, the ECU 5 increments a count value of a counter by a predetermined constant value, such as "1". Before the first time of execution of the operation in step S3, the count value of the counter is set to an initial value of zero.

The counter can be designed as a hardware inner counter of the ECU 5 or as a software-configured counter. The count value represents a time ET that has elapsed since the shift of the current value of the command duty cycle to the first threshold duty cycle T1 or into the unallowable range UR. The time ET will be referred to as elapsed time ET hereinafter. The count value is used as a time indicator required for the CPU 5a to restrict the feedback control of the command duty cycle.

After the increment of the count value of the counter, the ECU 5 proceeds to step S4.

In step S4, the ECU 5 determines whether the count value is equal to or higher than a predetermined value C. The predetermined value C represents a marginal length of time Tc against the elapsed time ET after the current value of the command duty cycle has shifted to the first threshold duty cycle T1 or into the unallowable range UR.

Specifically, if it is determined that the count value is equal to or greater than the predetermined value C (the determination in step S4 is YES), the ECU 5 proceeds to step S5. Otherwise if it is determined that the count value is smaller than the predetermined value C (the determination in step S4 is NO), the ECU 5 exits the exhaust-gas recirculation task.

In step S5, the ECU 5 limits the feedback control of the command duty cycle.

Specifically, the ECU 5 matches the current value of the command duty cycle with the second threshold duty cycle T2. The execution of the operation in step S5 allows the control mode of the ECU 5 for the command duty cycle to be shifted from a normal feedback control mode based on the angular-position deviation into a command duty-cycle limitation mode based on the second threshold duty cycle T2.

On the other hand, if it is determined that the deviation between the target angular position and the current angular position is greater than the predetermined threshold D (the determination in step S1 is NO), the ECU 5 proceeds to step S6.

In step S6, the ECU 5 determines that it is unnecessary to execute the command duty-cycle limitation. Then, the ECU 5 maintains its operation mode when the current operation mode is the normal feedback control mode, or returns its operation mode into the normal feed back control mode when the current operation mode is the command duty-cycle limitation mode. Thereafter, the ECU 5 proceeds to step S7.

In step S7, the ECU 5 resets the count value of the counter to the initial value.

Because the ECU 5 executes the exhaust-gas recirculation task at a given cycle, whether a current value of the command duty cycle falls outside the allowable range AR is periodically determined (see steps S2 to S4), and the feedback control of the current value of the command duty cycle is restricted when the current value of the command duty cycle falls outside the allowable range AR.

Operations of the EGR control system 1 will be described hereinafter with reference to a time chart illustrated in FIG. 4.

Specifically, when the target angular position is shifted from a "θ*1" on the valve-opening side from the fully close position θC to a "θ*2" on the valve-opening side (EGR passage opening side) from the target angular position θ*1 at time t=t0, the deviation between the target angular position θ*2 and the current angular position increases. This allows the command duty cycle to start to rise so that the application torque is increased (see (a), (b), and (c) of FIG. 4).

The increase of the application torque allows the butterfly valve 3 to rotate toward the valve-opening side. With the rotation of the butterfly valve 3, the current angular position of the valving element 8 shifts in the valve-opening side, so that the application torque is more increased to maintain the rotation of the butterfly valve 3, and therefore, the command duty cycle keeps rising up.

Figure 4:
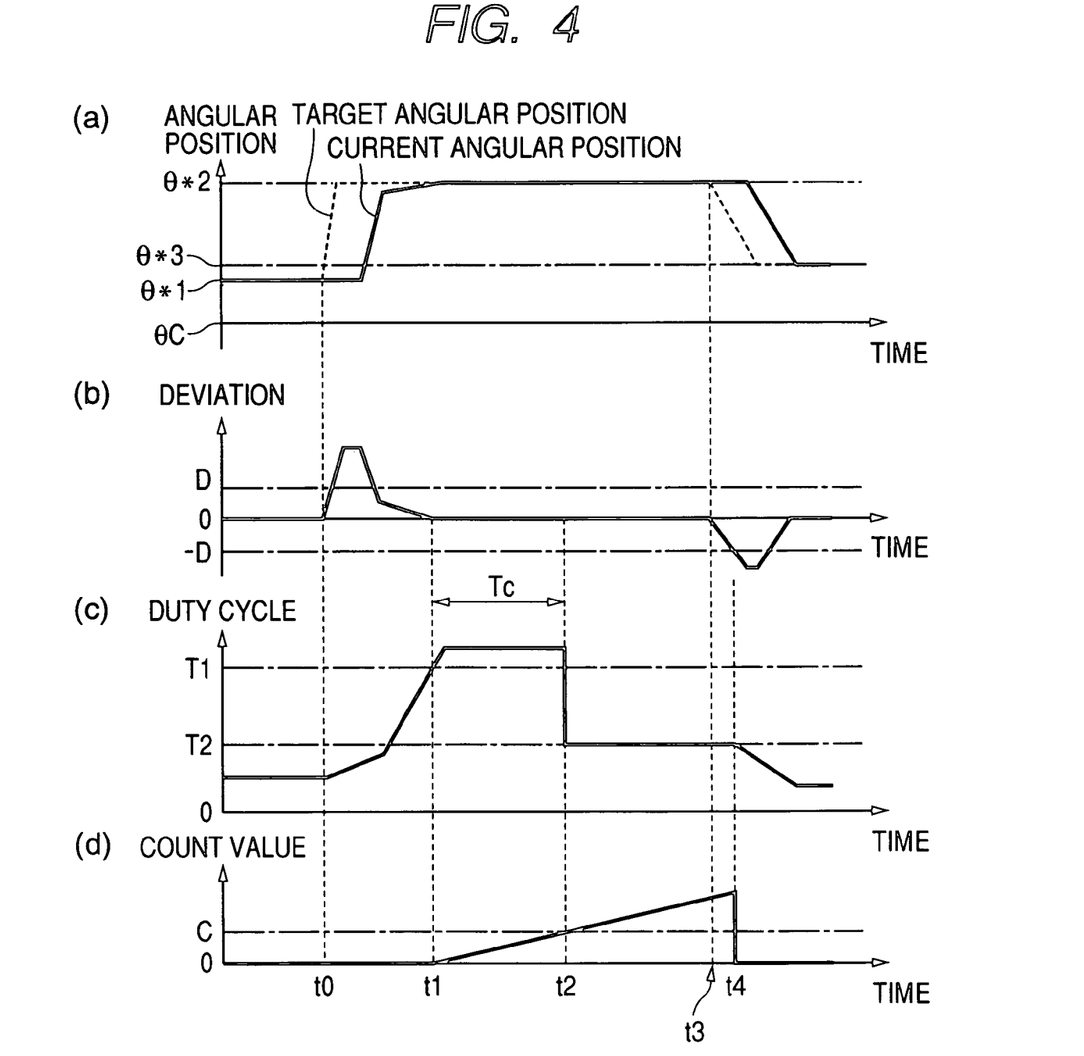
FIG. 4 is a time chart schematically illustrating transitions in: (a) angular positions of the butterfly valve, (b) deviations between target angular positions and corresponding current angular positions, (c) command duty cycles, and (d) count values according to the first embodiment.

The continuous rising of the command duty cycle allows the current angular position of the butterfly valve 3 to continue to be close to the target angular position θ*2, so that the deviation between the target angular position and the current angular position becomes equal to or lower than the predetermined threshold D (see "YES" in step S1 of FIG. 3 and (b) of FIG. 4), and therefore, the current angular position of the valve 3 substantially agrees with the target angular position θ*2 (see (a) of FIG. 4).

When the command duty cycle is equal to or higher than the first threshold duty cycle T1 at time t=t1 due to increase of the application torque (see "YES" in step S2 of FIG. 3 and (c) of FIG. 4), the count value of the counter starts to be incremented by the predetermined constant value at every cycle of the exhaust-gas recirculation task after time t=t1 (see step S3 in FIG. 3).

Thereafter, when the count value of the counter reaches the predetermined value C at time t=t2 (see "YES" in step S4 of FIG. 3 and (d) of FIG. 4), computation of the command duty cycle based on the feedback control is interrupted (see (c) of FIG. 4), and, continuously, limitation of the feedback control of the command duty cycle is started (see step S5 in FIG. 3).

This permits the command duty cycle to fall down from the first threshold duty cycle T1 to the second threshold duty cycle T2, and to be kept to the second threshold duty cycle T2 (see (c) of FIG. 4).

Thereafter, at time t=t3, decrease of the target angular position of the valve 3 is started, so that, when the deviation between the target angular position and the current angular position becomes higher than the predetermined threshold D (see "NO" in step S1 of FIG. 3 and (b) of FIG. 4), the feedback control of the command duty cycle is released from restriction (see step S6 in FIG. 3).

The release of the feedback control of the command duty cycle from restriction allows the command duty cycle to be computed based on the ECU's feedback control, and simultaneously, the count value of the counter to be reset to the initial value of zero (see (d) of FIG. 4).

After time t=t4, because the command duty cycle is started to decrease based on the ECU's feedback control (see (c) of FIG. 4), the application torque is decreased, so that the current angular position of the valve 3 is shifted from the "θ*1" toward the fully close position θC.

Thereafter, when the deviation between a new target angular position "θ*3" and the current angular position becomes equal to or lower than the predetermined threshold D (see "YES" in step S1 of FIG. 3 and (b) of FIG. 4), the current angular position of the valve 3 substantially agrees with the new target angular position "θ*3".

As described above, in the EGR control system 1 according to the first embodiment, the ECU 5 is configured to:

separate the numerical range within which the command duty cycle can take values into the allowable range AR and the unallowable range UR established on the basis of the operation stability of the electric motor 4;

store, in the memory unit 5b, the first threshold duty cycle T1 as the border between the allowable range AR and the unallowable range UR; and restrict the command duty cycle to the second threshold duty cycle T2 while stably maintaining the exhaust gas substantially recirculated in the EGR passage 2 toward the inlet side of the engine, thereby shifting the command duty cycle into the allowable range AR.

This allows the command duty cycle to run within the allowable range AR except when the command duty cycle temporarily shifts into the unallowable range UR. In other words, even if the amount of power to be supplied to the electric motor 4 reaches its upper limit or exceeds it, the ECU 5 allows these situations to be temporary and limited.

Accordingly, it is possible to ensure the operational stability of the electric motor 4.

Moreover, the EGR control system 1 is configured to maintain the exhaust gas continuously recirculated in the EGR passage 2 toward the inlet side of the engine. This permits the exhaust gas not to be fully transferred toward the outlet side of the engine, making it possible to prevent emissions in the exhaust gas from significantly increasing.

In addition, the second threshold duty cycle can be freely established within a range defined to be lower than the first threshold duty cycle. For this reason, it is possible to control the angular position of the butterfly valve 3 with the electric motor 4 being stably driven depending on a given stable level to be ensured.

Second Embodiment

The structure of an EGR control system according to a second embodiment of the present invention is substantially identical to that of the EGR control system 1 according to the first embodiment. Like reference characters are therefore assigned to like parts in the EGR control systems according to the first and second embodiments so that descriptions of the parts of the EGR control system according to the second embodiment will be omitted.

The ECU 5 of the EGR control system according to the second embodiment has various characteristics associated with control of the angular position of the valving element 8, which will be described hereinafter.

Specifically, the ECU 5 stores in advance the first and second threshold duty cycles T1 and T2 in the memory unit 5b.

When the deviation between the target angular position and the current angular position is equal to or lower than the predetermined threshold D, and the command duty cycle shifts to the first threshold duty cycle T1 or falls within the unallowable range UR through the first threshold duty cycle T1, the ECU 5 is operative to detect, as a target maintenance angular position, the current angular position at which the command duty cycle reaches the first threshold duty cycle T1.

In addition, the ECU 5 is operative to change the command duty cycle to be supplied to the electric motor 4 through the motor driver 11, thereby selecting one of some of the changed values of the command duty cycle as a maintenance limit duty cycle. Some of the changed values of the command duty cycle allow the current angular position of the valve 3 to be kept at the target maintenance angular position. The one of some of the changed values of the command duty cycle to be detected as the maintenance limit duty cycle is located at the most stable side in the allowable range AR. In other words, the one of some of the changed values of the command duty cycle to be detected as the maintenance limit duty cycle is farthest from the first threshold duty cycle T1.

Moreover, the ECU 5 is operative to adjust the command duty cycle so that it substantially agrees with any one of values between the second threshold command duty cycle T2 and the maintenance limit duty cycle, thereby shifting the command duty cycle into the allowable range AR.

It is to be noted that the maintenance limit duty cycle substantially corresponds to a duty cycle on the duty-cycle control line CL1 at the target maintenance angular position of the valve 3; this duty-cycle control line CL1 contributes to the first countervailing torque against the spring force (see FIG. 2). Specifically, the maintenance limit duty cycle does not contribute to the second countervailing torque and the third countervailing torque. This is because the sliding frictional force as the component of the resistance actively contributes against rotation of the butterfly valve 3, but it is inactive against hold of the butterfly valve 3 at a given angular position.

Accordingly, upon rotation of the butterfly valve 3 against the resistance, it is necessary to set the command duty cycle to be equal to or higher than a predetermined value consisting of the sum of:

the first component contributing to the first countervailing torque against the spring force, the second component contributing to the second countervailing torque to be created by the electric motor 4 against the sliding frictional force of the seal ring 9, and the third component contributing the third countervailing torque against the sliding frictional force between the outer periphery of the valve shaft 7 and the bearings.

In contrast, upon hold of the butterfly valve 3 at a predetermined angular position, it is necessary to set the command duty cycle to be equal to or higher than a predetermined value corresponding to the first component contributing to the first countervailing torque against the spring force.

As described above, the maintenance limit duty cycle substantially agrees with the predetermined value corresponding to the first component contributing to the first countervailing torque against the spring force at the target maintenance angular position of the valve 3.

The ECU 5 according to the second embodiment is operative to detect the maintenance limit duty cycle, and to set the maintenance limit duty cycle as a candidate for the destination of the command duty cycle to shit it into the allowable range AR.

For example, let us consider that the ECU 5 is operative to execute the feedback control of the command duty cycle to be output therefrom to the motor driver 11 in accordance with the duty-cycle control line F (see FIG. 2).

In this case, when the deviation between the target angular position and the current angular position is equal to or lower than the predetermined threshold D, and the command duty cycle reaches the first threshold duty cycle T1, the ECU 5 is operative to reduce the command duty cycle corresponding to the first threshold duty cycle T1 up to the second duty cycle T2 or the maintenance limit duty cycle along a line representing the rotational position continuously equal to the angular position θF (see the dashed line to which reference character L is assigned in FIG. 2).

It is to be noted that, in the second embodiment, the maintenance limit duty cycle is, for example, set to be lower than the second threshold duty cycle T2, so that the ECU 5 permits the command duty cycle to fall down up to the maintenance limit duty cycle.

Figure 5:
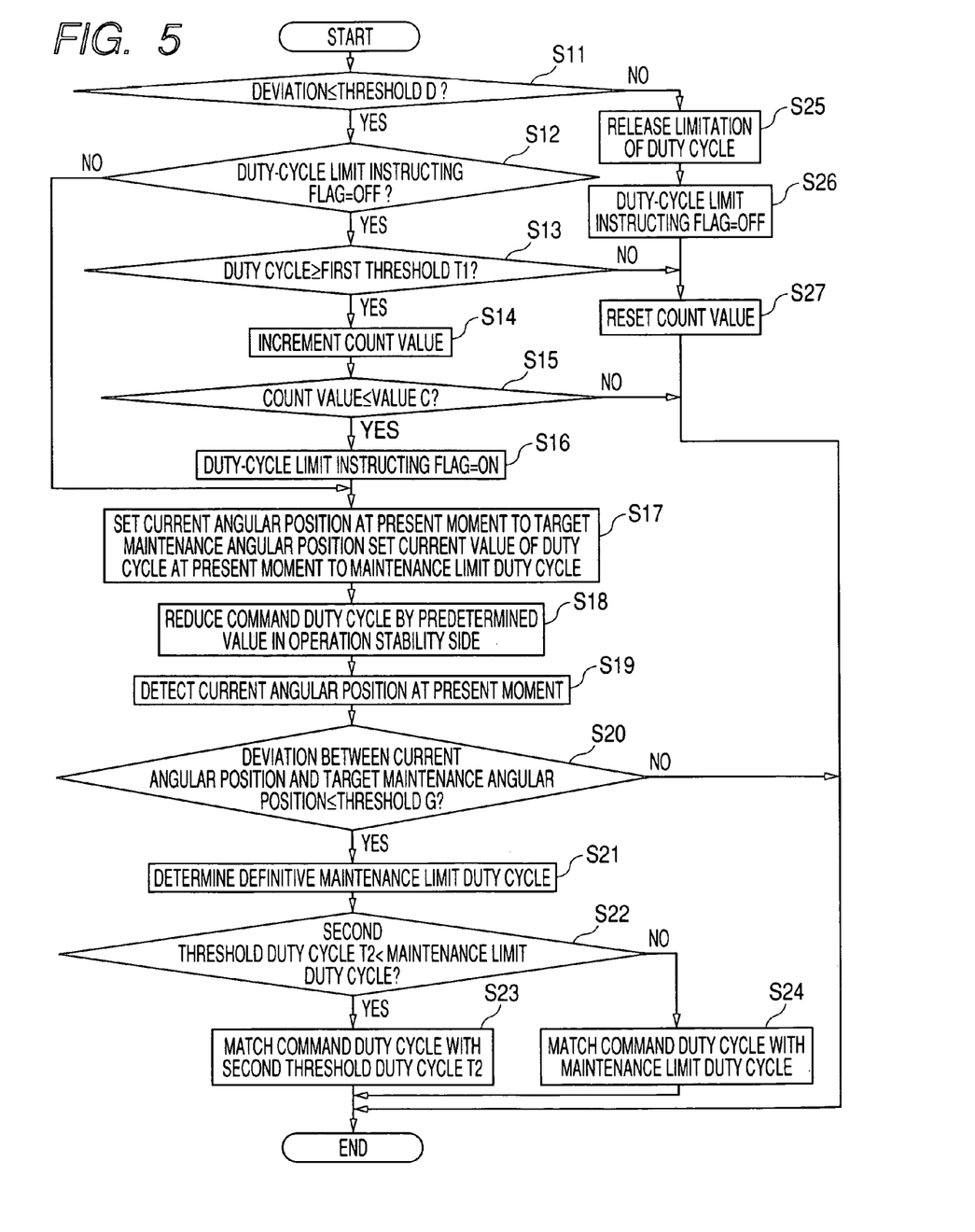
FIG. 5 is a flowchart schematically illustrating an exhaust-gas recirculation task to be executed by the ECU according to a second embodiment of the present invention.

FIG. 5 schematically illustrates an exhaust-gas recirculation task (an adjusting task of the opening area of the EGR passage 2), the summary of which has been described hereinbefore, to be executed by the ECU 5 in accordance with at least one program to be loaded to the memory unit 5b according to the second embodiment. Specifically, the ECU 5 periodically executes the exhaust-gas recirculation task in response to, for example, input of a measured current angular position of the valving element 8 sent from the valve angular position sensor 12.

In step S11, the ECU 5 computes a target angular position of the valving element 8 based on monitored measurands sent from the sensors 13a1 to 13an, and determines whether the deviation between the target angular position and the current angular position is equal to or lower than the predetermined threshold D.

The operation in step S11 permits whether the current angular position of the valving element 8 substantially agrees with the target angular position to be determined.

If it is determined that the deviation between the target angular position and the current angular position is equal to or lower than the predetermined threshold D (the determination in step S11 is YES), the ECU 5 proceeds to step S12, and otherwise proceeding to step S25.

In step S12, the ECU 5 determines whether a duty-cycle limit instructing flag is in off state. It is to be noted that the duty-cycle limit instructing flag has been set in the CPU 5a of the ECU 5. It is also to be noted that the ECU 5 is operative to turn the duty-cycle limit instructing flag on when the need for shifting the command duty cycle, which has just taken the first threshold duty cycle T1 or has just shifted into the unallowable range UR, arises. For example, the ECU 5 will turn the duty-cycle limit instructing flag on in step S16 hereinafter.

If it is determined that the duty-cycle limit instructing flag is in off state (the determination in step S12 is YES), the ECU 5 proceeds to step S13, and otherwise proceeding to step S17.

In step S13, the ECU 5 retrieves the first threshold duty cycle T1 from the memory unit 5b, and determines whether a current value of the command duty cycle is equal to or higher than the first threshold duty cycle T1. The operation in step S13 allows determination of whether the current value of the command duty cycle shifts to the first threshold duty cycle T1 or falls within the unallowable range UR.

If it is determined that the current value of the command duty cycle is equal to or greater than the first threshold duty cycle T1 (the determination in step S13 is YES), the ECU 5 proceeds to step S14, and otherwise proceeding to step S27.

In step S14, the ECU 5 increments a count value of the counter by a predetermined constant value, such as "1". Before the first time of execution of the operation in step S14, the count value of the counter is set to an initial value of zero. The counter has the same structure and function as the counter according to the first embodiment.

After the increment of the count value of the counter, the ECU 5 proceeds to step S15.

In step S15, the ECU 5 determines whether the count value is equal to or higher than a predetermined value C. The predetermined value C represents a marginal length of time against the elapsed time ET after the current value of the command duty cycle has shifted to the first threshold duty cycle T1 or into the unallowable range UR.

Specifically, if it is determined that the count value is equal to or greater than the predetermined value C (the determination in step S15 is YES), the ECU 5 proceeds to step S16. Otherwise if it is determined that the count value is smaller than the predetermined value C (the determination in step S15 is NO), the ECU 5 exits the exhaust-gas recirculation task.

In step S16, the ECU 5 turns the duty-cycle limit instructing flag on. The on state of the duty-cycle limit instructing flag allows the control mode of the ECU 5 for the command duty cycle to be shifted from a normal feedback control mode based on the angular-position deviation into a command duty-cycle limitation mode within the allowable range AR.

In step S17, the ECU 5 sets a current angular position measured by the valve angular position sensor 12 at the present moment to the target maintenance angular position. Simultaneously, the ECU 5 temporarily sets a current value of the command duty cycle at the present moment to the maintenance limit duty cycle, proceeding to step S18.

In step S18, the ECU 5 reduces the current value of the command duty cycle by a predetermined value (percentage) in the operation stabile side of the electric motor 4 (command duty cycle reducing side), proceeding to step S19.

In step S19, the ECU 5 detects a current angular position measured by the valve angular position sensor 12 at the present moment. In other words, the ECU 5 detects a current angular position measured by the valve angular position sensor 12 immediately after reduction of the command duty cycle by the predetermined value. Thereafter, the ECU 5 proceeds to step S20.

In step S20, the ECU 5 determines whether the deviation between the current angular position measured immediately after reduction of the command duty cycle by the predetermined value and the target maintenance angular position exceeds a predetermined threshold (a predetermined positive angle) G.

The operation in step S20 allows determination of whether the current angular position is deviated from the target maintenance angular position even if the command duty cycle is reduced by the predetermined value. In other words, the operation in step S20 allows determination of whether the current angular position is kept at the target maintenance angular position even if the command duty cycle is reduced by the predetermined value.

If it is determined that the deviation between the current angular position and the target maintenance angular position exceeds the predetermined threshold G (the determination in step S20 is YES), the ECU 5 proceeds to step S21, and otherwise, exiting the exhaust-gas recirculation task.

In step S21, the ECU 5 finally determines the temporarily set maintenance limit duty cycle as a definitive maintenance limit duty cycle. In other words, the ECU 5 finally determines, as the definitive maintenance limit duty cycle, a command duty cycle immediately before the current angular position is deviated from the target maintenance angular position by the predetermined threshold G and over. Thereafter, the ECU 5 proceeds to step S22.

In step S22, the ECU 5 determines which of the second threshold duty cycle T2 and the definitive maintenance limit duty cycle is more shifted toward the operation stably side of the electric motor 4 (command duty cycle reducing side). In other words, the ECU 5 determines which one of the second threshold duty cycle T2 and the definitive maintenance limit duty cycle is lower than the other thereof.

If it is determined that the second threshold duty cycle T2 is lower than the definitive maintenance limit duty cycle (the determination in step S22 is YES), the ECU 5 proceeds to step S23, and otherwise, proceeding to step S24.

In step S23, the ECU 5 matches a current value of the command duty cycle with the second threshold duty cycle T2, thereby limiting control of the command duty cycle.

In step S24, the ECU 5 matches a current value of the command duty cycle with the definitive maintenance limit duty cycle, thereby limiting control of the command duty cycle.

On the other hand, if it is determined that the deviation between the target angular position and the current angular position is greater than the predetermined threshold D (the determination in step S11 is NO), the ECU 5 proceeds to step S25.

In step S25, the ECU 5 determines that it is unnecessary to execute the command duty-cycle limitation. Then, the ECU 5 maintains its operation mode when the current operation mode is the normal feedback control mode, or returns its operation mode into the normal feed back control mode. Thereafter, the ECU 5 proceeds to step S26.

In step S26, the ECU 5 turns the duty-cycle limit instructing flag off, and sequentially, resets the count value of the counter to the initial value.

Operations of the EGR control system according to the second embodiment will be described hereinafter with reference to a time chart illustrated in FIG. 6.

Figure 6:
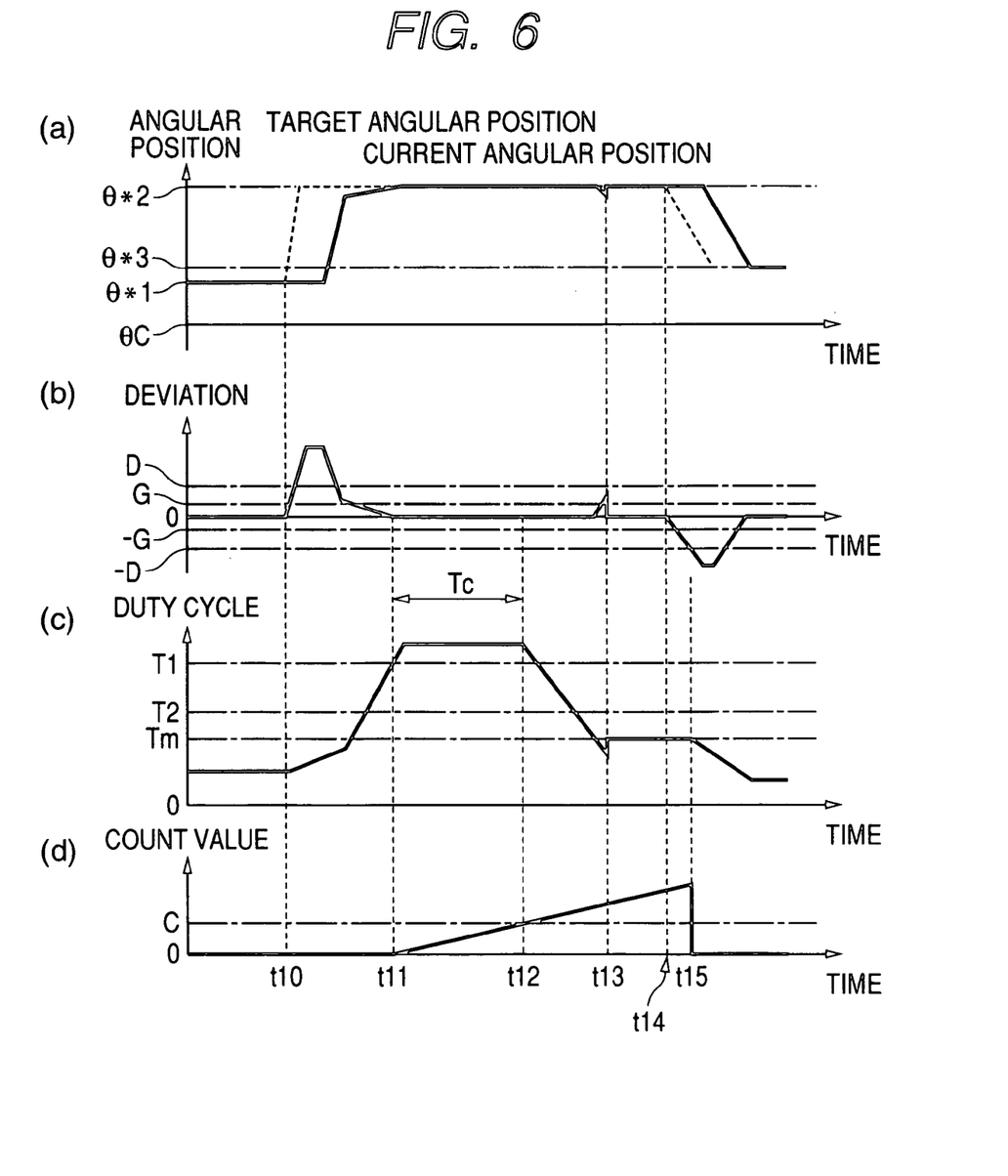
FIG. 6 is a time chart schematically illustrating transitions in: (a) angular positions of the butterfly valve, (b) deviations between target angular positions and corresponding current angular positions, (c) command duty cycles, and (d) count values according to the second embodiment.

Specifically, when the target angular position is shifted from a "θ*1" on the valve-opening side from the fully close position θC to a "θ*2" on the valve-opening side from the target angular position θ*1 at time t=t10, the command duty cycle starts to rise so that the application torque is increased (see (a) and (c) of FIG. 6).

The increase of the application torque allows the butterfly valve 3 to rotate toward the valve-opening side (EGR passage opening side), so that the deviation between the target angular position θ*2 and the current angular position increases to exceed the predetermined threshold D (see (b) of FIG. 6).

With the rotation of the butterfly valve 3, the current angular position of the valving element 8 shifts toward the valve-opening side, so that the application torque is more increased to maintain the rotation of the butterfly valve 3, and therefore, the command duty cycle keeps rising up.

The continuous rising of the command duty cycle allows the current angular position of the butterfly valve 3 to continue to be close to the target angular position θ*2, so that the deviation between the target angular position and the current angular position becomes equal to or lower than the predetermined threshold D (see "YES" in step S11 of FIG. 5 and (b) of FIG. 6), and therefore, the current angular position of the valve 3 substantially agrees with the target angular position θ*2 (see (a) of FIG. 6).

When the command duty cycle is equal to or higher than the first threshold duty cycle T1 at time t=t11 due to increase of the application torque (see "YES" in step S13 of FIG. 6 and (c) of FIG. 6), the count value of the counter starts to be incremented by the predetermined constant value at every cycle of the exhaust-gas recirculation task after time t=t11 (see step S14 in FIG. 6).

Thereafter, when the count value of the counter reaches the predetermined value C at time t=t12 (see "YES" in step S15 of FIG. 6 and (d) of FIG. 6), reduction of the command duty cycle is started to obtain the maintenance limit duty cycle Tm (see steps S16 to S18 in FIG. 5 and (c) of FIG. 6). In other words, computation of the command duty cycle based on the feedback control is interrupted, so that limitation of the feedback control of the command duty cycle is started.

When the current angular position of the valve 3 is not kept at the target maintenance angular position, reduction of the duty cycle is interrupted. In other words, when the deviation between the current angular position measured immediately after the reduction of the command duty cycle by the predetermined value and the target maintenance angular position is equal to or greater than the predetermined threshold G, the reduction of the duty cycle is interrupted (see "YES" in step S20 and (c) of FIG. 6).

Simultaneously with the interruption of the duty-cycle reduction, a command duty cycle immediately before the current angular position is deviated from the target maintenance angular position by the predetermined threshold G and over is determined as the definitive maintenance limit duty cycle Tm (see step S21).

It is to be noted that the definitive maintenance limit duty cycle Tm is lower than the second threshold duty cycle T2 so that the definitive maintenance limit duty cycle Tm is more shifted toward the operation stably side of the electric motor 4 than the second threshold duty cycle T2. For this reason, the command duty cycle is maintained at the definitive maintenance limit duty cycle Tm until the limitation of the feedback control of the command duty cycle is released (see "NO" in step S22 and step S24 and (c) of FIG. 6.

Thereafter, at time t=t14, decrease of the target angular position of the valve 3 is started, so that, when the deviation between the target angular position and the current angular position becomes higher than the predetermined threshold D at time t=t15 (see "NO" in step S11 of FIG. 5 and (b) of FIG. 6), the feedback control of the command duty cycle is released from limitation (see step S25 in FIG. 5).

The release of the feedback control of the command duty cycle from limitation allows the command duty cycle to be computed based on the ECU's feedback control, and simultaneously, the count value of the counter to be reset to the initial value of zero (see (d) of FIG. 6).

After time t=t15, because the command duty cycle is started to decrease based on the ECU's feedback control (see (c) of FIG. 6), the application torque is decreased, so that the current angular position of the valve 3 is reduced.

Thereafter, when the deviation between the target angular position and the current angular position becomes equal to or lower than the predetermined threshold D (see "YES" in step S11 of FIG. 5 and (b) of FIG. 6), the current angular position of the valve 3 substantially agrees with a new target angular position "θ*3".

As described above, in the EGR control system 1 according to the second embodiment, the ECU 5 is configured to:

store, in advance, the first and second threshold duty cycles T1 and T2 in the memory unit 5b;

when the deviation between the target angular position and the current angular position is equal to or lower than the predetermined threshold D, and the command duty cycle shifts to the first threshold duty cycle T1 or falls within the unallowable range UR through the first threshold duty cycle T1, detect, as a target maintenance angular position, the current angular position at which the command duty cycle reaches the first threshold duty cycle T1;

reduce the command duty cycle by a predetermined value (percentage) to detect one of some of values of the command duty cycle as a maintenance limit duty cycle, some of the values allowing the current angular position of the valve 3 to be kept at the target maintenance angular position, and the one of some of the values being located at the most stable side in the allowable range AR; and adjust the command duty cycle so that it substantially agrees with any one of values between the second threshold command duty cycle T2 and the maintenance limit duty cycle, thereby shifting the command duty cycle into the allowable range AR.

Some of the values of the command duty cycle that allow the current angular position of the valve 3 to be kept at the target maintenance angular position do not contribute to the second countervailing torque and the third countervailing torque correspond to the sliding frictional force. For this reason, some of the values of the command duty cycle are sufficient to contribute to the first countervailing torque against the spring force.

Accordingly, even if the command duty cycle reaches the first threshold duty cycle T1 or falls within the unallowable range UR, it is possible to shift the command duty cycle into the allowable range AR while a current angular position of the valve 3 at which the command duty cycle just has reached the first threshold duty cycle T1 is kept as the target maintenance angular position. This allows the command duty cycle to be shifted into the allowable range AR with almost no decrease in the volume of the recirculated exhaust gas.

Moreover, as the electric motor 4, one of various types of electric motors capable of providing, to the valve 3, application torque that is sufficiently stronger than the spring force, is preferably used. Reduction of the command duty cycle up to the maintenance limit duty cycle corresponding to the spring force therefore allows the command duty cycle to stably fall within the allowable range AR with almost no decrease in the volume of the recirculated exhaust gas.

Moreover, even if, as the electric motor 4, an electric motor incapable of providing, to the valve 3, sufficiently strong application torque as compared with the spring force, set of the second threshold duty cycle T2 to a value located as a sufficiently stable side in the allowable range AR permits the command duty cycle to be shifted so that the command duty cycle substantially agrees with the second threshold duty cycle T2.

Accordingly, despite slight reduction of the volume of the recirculated exhaust gas as compared with using the maintenance limit duty cycle, it is possible to prevent emissions in the exhaust gas from deteriorating.

In each of the first and second embodiments, the ECU 5 gives, as the application torque parameter, the command duty cycle to the motor driver 11, thereby controlling the electrical motor 4 via the motor, but the present invention is not limited to the structure.

Specifically, in a first modification, as the application torque parameter, the ECU 5 can give an instruction indicative of the amount of power to be supplied to the electric motor 4 to the motor driver 11. For example, as illustrated in FIG. 4 or FIG. 6, the ECU 5 can control, through the motor driver 11, the duration of each current pulse in a pulsed current to be supplied to the electric motor 4 in accordance with the duty-cycle characteristic with time (see FIG. 4 or FIG. 6).

The first modification allows the same effects as each of the first and second embodiments to be obtained.

Moreover, in a second modification, the ECU 5 can give an instruction indicative of the deviation between the target angular position and the current angular position; this instruction allows the motor driver 11 to supply, to the electric motor 4, the amount of power depending on the instructed deviation.

For example, as illustrated by (c) of FIG. 4, when the deviation between the current angular position of the valve 3 and the target angular position is substantially zero at time t=t1, the ECU 5 starts to increment the count value by the predetermined constant value at every cycle of the exhaust-gas recirculation task after time t=t1 (see step S3 in FIG. 3).

Thereafter, when the count value of the counter reaches the predetermined value C at time t=t2 (see "YES" in step S4 of FIG. 3 and (d) of FIG. 4), the ECU 5 interrupts computation of the command duty cycle based on the feedback control (see (c) of FIG. 4), and continuously, restricts the command duty cycle to the second threshold.

The second modification allows the same effects as each of the first and second embodiments to be obtained.

Moreover, in each of the first and second embodiments, when the current value of the command duty cycle is equal to or greater than the first threshold duty cycle T1 (the determination in step S2 is YES), the ECU 5 executes the command duty cycle restricting operation in step S5 after the marginal length of time Tc has elapsed since the shift of the command duty cycle to the first threshold duty cycle T1 or into the unallowable range UR. The present invention is however limited to the structure.

Specifically, when the current value of the command duty cycle is equal to or greater than the first threshold duty cycle T1 (the determination in step S2 is YES), the ECU 5 can execute the command duty cycle restricting operation in step S5 immediately after the shift of the command duty cycle to the first threshold duty cycle T1 or into the unallowable range UR.

Why the ECU 5 executes the command duty cycle restricting operation in step S5 after the marginal length of time Tc has elapsed since the shift of the command duty cycle to the first threshold duty cycle T1 or into the unallowable range UR will be described hereinafter.

Specifically, when, after the command duty cycle temporally shifts to the first threshold duty cycle T1 or into the unallowable range UR, it returns into the allowable range AR before the elapse of the marginal length of time Tc, it is possible to maintain the feedback control of the command duty cycle without interrupting it. This allows the feedback control of the command duty cycle to be smoothly continued even if the command duty cycle temporally shifts to the first threshold duty cycle T1 or into the unallowable range UR and returns into the allowable range AR.

In addition, in each of the first and second embodiments, increment of the count value of the counter is started when the command duty cycle is equal to or higher than the first threshold duty cycle T1, but the present invention is not limited to the structure.

Specifically, the deviation between the target angular position and the current angular position is equal to or lower than the predetermined threshold D and a predetermined time has elapsed since the deviation changing timing below the predetermined threshold D.

In each of the first and second embodiments, the present invention is applied to EGR control systems capable of controlling the actuator 4 to control rotation of the valving element 8 installed in the EGR passage 2 through which part of exhaust gas emitted from engine is returned into the combustion chamber thereof. The present invention is however is limited to the application.

Specifically, the present invention is applied to systems for controlling an actuator to rotate a valving element installed in a passage through which gas flows, thereby adjusting an opening area of the passage.

In addition, those skilled in the art will appreciate that the present invention is capable of being distributed as program products, for example, the programs stored in the memory unit 5b in a variety of forms. It is also important to note that the present invention applies equally regardless of the particular type of signal bearing media used to actually carry out the distribution. Examples of suitable signal bearing media include recordable type media such as CD-ROMs/RAMs, DVD-ROMs/RAMs, and flash memories, and transmission type media such as digital and analog communications links.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A system for controlling an actuator linked to a valve rotatably installed in a passage through which gas flows, the actuator being configured to change, based on a controllable torque parameter and a deviation between a current position of the valve and a target position thereof, torque to be applied to the valve, the torque parameter representing the torque to be applied to the valve, the system comprising:

a first storing unit configured to store therein a first threshold, the first threshold being defined in a variation range within which the torque parameter is variable, the first threshold separating the variation range into a first range and a second range, when the torque parameter takes values within the first range, an operational stability of the actuator being ensured, when the torque parameter takes values within the second range, the operational stability of the actuator being difficult to be ensured; and a restricting unit configured to:

determine whether the deviation between the target position of the valve and the current position thereof is equal to or lower than a predetermined length in a rotational direction of the valve; and if the torque parameter substantially shifts, from the first range, to and/or through the first threshold in the variation range and it is determined that the deviation is equal to or lower than the predetermined length in the rotational direction of the valve, change the torque parameter such that the torque parameter is within the first range to thereby restrict variation in the torque parameter with a flow of the gas being substantially kept through the passage.

2. The system according to claim 1, further comprising a second storing unit configured to store therein a second threshold, the second threshold defining a second limit in the first range, the restricting unit being configured to, if the torque parameter substantially shifts from the second range at least to and through the first threshold, substantially match the torque parameter with the second threshold.

3. The system according to claim 1, wherein the torque parameter is the deviation between the target position of the valve and the current position thereof, the first threshold is zero, and the restricting unit is configured to, if the deviation substantially shifts to the zero in the variation range and it is determined that the deviation is equal to or lower than the predetermined length in the rotational direction of the valve, change the torque parameter such that the torque parameter is within the first range to thereby restrict variation in the deviation with the flow of the gas being substantially kept through the passage.

4. The system according to claim 1, wherein the restricting unit is configured to:

measure, if the torque parameter substantially shifts, from the first range, to and/or through the first threshold in the variation range, a time that has elapsed since the shift of the torque parameter at least to and through the first threshold in the variation range on condition that the torque parameter is not returned to the first range;

determine whether the measured time is equal to or greater than a predetermined length of time; and if it is determined that the deviation is equal to or lower than the predetermined length in the rotational direction of the valve and the measured time is equal to or greater than the predetermined length of time, change the torque parameter such that the torque parameter is within the first range to thereby restrict variation of the torque parameter with the flow of the gas being substantially kept through the passage.

5. The system according to claim 1, wherein the first threshold separates the variation range into a first range and a second range, when the torque parameter takes values within the first range, an operational stability of the actuator being ensured, when the torque parameter takes values within the second range, the operational stability of the actuator being difficult to be ensured, further comprising a second storing unit configured to store therein a second threshold, the second threshold defining a second limit in the first range, and wherein the restricting unit is configured to:

determine whether the deviation between the target position of the valve and the current position thereof is equal to or smaller than a predetermined length in a rotational direction of the valve;

if the torque parameter substantially shifts, from the second range, to and/or through the first threshold and it is determined that the deviation is equal to or smaller than the predetermined length in the rotational direction of the valve, detect a position of the valve at which the torque parameter shifts to the first threshold in the range as a target maintenance position;

shift the torque parameter into the first range to select, as maintenance limit value, one of values that allow the current position of the valve to be kept at the target maintenance position, the selected one of the values being the farthest from the first threshold; and substantially match the torque parameter with any one of the second threshold and the maintenance limit value to shift the torque parameter into the first range.

6. The system according to 1, wherein the system is installed in a vehicle, the gas is part of exhaust gas emitted from an outlet side of an engine installed in the vehicle, the passage is an exhaust-gas recirculation passage through which the part of exhaust gas is recirculated into an inlet side of the engine.

7. A program product embedded in a first memory for controlling an actuator linked to a valve rotatably installed in a passage through which gas flows, the actuator being configured to change, based on a controllable torque parameter and a deviation between a current position of the valve and a target position thereof, torque to be applied to the valve, the torque parameter representing the torque to be applied to the valve, the program product comprising:

first means for instructing a computer to retrieve a first threshold from at least one of the first memory and a second memory, the first threshold being stored in at least one of the first and second memories in advance, the first threshold being defined in a variation range within which a torque parameter is variable, the first threshold separating the variation range into a first range and a second range, when the torque parameter takes values within the first range, an operational stability of the actuator being ensured, when the torque parameter takes values within the second range, the operational stability of the actuator being difficult to be ensured; and second means for instructing a computer to:

determine whether the deviation between the target position of the valve and the current position thereof is equal to or lower than a predetermined length in a rotational direction of the valve; and if the torque parameter substantially shifts, from the first range, to and/or through the first threshold in the variation range and it is determined that the deviation is equal to or lower than the predetermined length in the rotational direction of the valve, change the torque parameter such that the torque parameter is within the first range to thereby restrict variation in the torque parameter with a flow of the gas being substantially kept through the passage.

8. A method of controlling an actuator linked to a valve rotatably installed in a passage through which gas flows, the actuator being configured to change, based on a controllable torque parameter and a deviation between a current position of the valve and a target position thereof, torque to be applied to the valve, the torque parameter representing the torque to be applied to the valve, the method comprising:

storing therein a first threshold, the first threshold being defined in a variation range within which a torque parameter is variable, the first threshold separating the variation range into a first range and a second range, when the torque parameter takes values within the first range, an operational stability of the actuator being ensured, when the torque parameter takes values within the second range, the operational stability of the actuator being difficult to be ensured;

determining whether the deviation between the target position of the valve and the current position thereof is equal to or lower than a predetermined length in a rotational direction of the value; and if the torque parameter substantially shifts, from the first range, to and/or through the first threshold in the variation range and it is determined that the deviation is equal to or lower than the predetermined length in the rotational direction of the valve, changing the torque parameter such that the torque parameter is within the first range to thereby restrict variation in the torque parameter with a flow of the gas being substantially kept through the passage.

9. The method according to 8, wherein the gas is part of exhaust gas emitted from an outlet side of an engine installed in a vehicle, and the passage is an exhaust-gas recirculation passage.

10. A computer readable medium tangibly storing instructions that, upon execution by a computer, perform a method of controlling an actuator linked to a valve rotatably installed in a passage through which gas flows, the actuator being configured to change, based on a controllable torque parameter and a deviation between a current position of the valve and a target position thereof, torque to be applied to the valve, the torque parameter representing the torque to be applied to the valve, the method comprising:

storing a first threshold, the first threshold being defined in a variation range within which a torque parameter is variable, the first threshold separating the variation range into a first range and a second range, when the torque parameter takes values within the first range, an operational stability of the actuator being ensured, when the torque parameter takes values within the second range, the operational stability of the actuator being difficult to be ensured;

determining whether the deviation between the target position of the valve and the current position thereof is equal to or lower than a predetermined length in a rotational direction of the valve; and if the torque parameter substantially shifts, from the first range, to and/or through the first threshold in the variation range and it is determined that the deviation is equal to or lower than the predetermined length in the rotational direction of the valve, changing the torque parameter such that the torque parameter is within the first range to thereby restrict variation in the torque parameter with a flow of the gas being substantially kept through the passage.

11. The computer readable medium according to claim 10, wherein the method further comprises:

storing a second threshold that defines a second limit in the first range; and if the torque parameter substantially shifts from the second range at least to and through the first threshold, substantially matching the torque parameter with the second threshold.

12. The computer readable medium according to claim 10, wherein:

the torque parameter is the deviation between the target position of the valve and the current position thereof, the first threshold is zero, and the method further comprises, if the deviation substantially shifts to the zero in the variation range and it is determined that the deviation is equal to or lower than the predetermined length in the rotational direction of the valve, changing the torque parameter such that the torque parameter is within the first range to thereby restrict variation in the deviation with the flow of the gas being substantially kept through the passage.

13. The computer readable medium according to claim 10, wherein the method further comprises:
    measuring, if the torque parameter substantially shifts, from the first range, to and/or through the first threshold in the variation range, a time that has elapsed since the shift of the torque parameter at least to and through the first threshold in the variation range on condition that the torque parameter is not returned to the first range;
    determining whether the measured time is equal to or greater than a predetermined length of time; and
    if it is determined that the deviation is equal to or lower than the predetermined length in the rotational direction of the valve and the measured time is equal to or greater than the predetermined length of time, changing the torque parameter such that the torque parameter is within the first range to thereby restrict variation of the torque parameter with the flow of the gas being substantially kept through the passage.

14. The computer readable medium according to 10, wherein the gas is part of exhaust gas emitted from an outlet side of an engine installed in a vehicle, and the passage is an exhaust-gas recirculation passage through which the part of the exhaust gas is recirculated into an inlet side of the engine.

15. The computer product according to 7, wherein the gas is part of exhaust gas emitted from an outlet side of an engine installed in a vehicle, and the passage is an exhaust-gas recirculation passage.

* * * * *